United States Patent [19]
Kawamura et al.

[11] Patent Number: 5,986,985
[45] Date of Patent: Nov. 16, 1999

[54] DUAL CD/DVD PLAYER WITH AUTOMATIC DISC IDENTIFICATION

[75] Inventors: Hisatoshi Kawamura, Iwaki; Jiro Ueki, Fuchu, both of Japan

[73] Assignee: Alpine Electronics, Inc., Japan

[21] Appl. No.: 08/969,641

[22] Filed: Nov. 13, 1997

[30] Foreign Application Priority Data

Jan. 29, 1997 [JP] Japan .................................. 9-029773

[51] Int. Cl.$^6$ .................................. G11B 7/00; G11B 3/90
[52] U.S. Cl. .................................. 369/44.27; 369/44.29; 369/58
[58] Field of Search .................................. 369/44.25, 44.26, 369/44.27, 44.29, 44.35, 54, 58, 124

[56] References Cited

U.S. PATENT DOCUMENTS

| | | | |
|---|---|---|---|
| 5,003,521 | 3/1991 | Yoshida et al. ........................ | 369/54 X |
| 5,235,581 | 8/1993 | Miyagawa et al. ................... | 369/58 X |
| 5,448,542 | 9/1995 | Ogino .................................... | 369/44.29 |
| 5,665,957 | 9/1997 | Lee et al. .............................. | 369/58 X |
| 5,831,952 | 11/1998 | Yamada et al. ................... | 369/44.27 X |
| 5,917,791 | 6/1999 | Tsuchiya et al. ...................... | 369/58 |

*Primary Examiner*—Paul W. Huber
*Attorney, Agent, or Firm*—Brinks Hofer Gilson & Lione

[57] ABSTRACT

An apparatus for playing back an optical recording medium automatically and quickly identifies the kind of optically recorded disc (CD or DVD) loaded in the apparatus. After a disc to be checked has been loaded in the apparatus, the disc is first driven in a DVD servo mode. If a peak value of a focus error signal detected in this mode is larger than a threshold value, the checked disc is recognized as a DVD. If the detected peak value of the focus error signal is smaller than the threshold value, the checked disc is thereafter driven in a CD servo mode. The checked disc is recognized as a CD if a peak value of a focus error signal detected in this mode is larger than a threshold value, which may be different from the above-mentioned threshold value.

7 Claims, 5 Drawing Sheets

DUAL CD/DVD PLAYER WITH AUTOMATIC DISC IDENTIFICATION

BACKGROUND OF THE INVENTION

1. Field of the Invention

The present invention relates to an apparatus for playing back an optical recording medium and, more particularly, to a digital disc player capable of reproduction both from a digital versatile disc (DVD) and a compact disc (CD).

2. Description of the Related Art

MEPG2 video/audio information compression techniques have been improved to a practical level, and the development of DVD players for reproducing images and sounds recorded on DVDs of the CD size using techniques of this kind are being promoted. A DVD loaded in such a DVD player has one or two signal recording surfaces formed on one side. Holes ("pits") are formed in each signal recording surface. There are several types of pit, differing in length. A track is formed by arranging such pits differing in length. During reproduction (play back) of a signal recorded on the disc, the pits are read along the track and various kinds of signal processing are performed on the read out signal to output video and audio signals.

Playback from the well-known CD is the same as that for a DVD with respect to signal reading along the sequence of pits formed on the disc, but differs in signal processing performed on the read-out signal.

On DVDs and CDs, signals are recorded by basically the same method. Also, basically the same signal reading method is used for DVDs and CDs. However, DVDs and CDs differ in both storage capacity and pit size. For example, a dual-layer DVD disc having two signal recording surface layers on one side has a capacity of 8.5 gigabytes, and a single-layer DVD disc having one signal recording surface layer has a capacity of 4..7 gigabytes. On the other hand, CDs have a capacity of about 780 megabytes. With respect to the pit size, both the length and width of DVD pits is approximately half that of CD pits.

As described above, DVDs and CDs differ from each other in the size of the pits formed in the signal recording surface. Therefore, if these two kinds of discs are played back by one dual mode player, changing the numerical aperture of an objective lens and the amplification factor of an RF amplifier in the player as well as other operations are required. As a prerequisite for such changes, identification of the kind of a disc as a DVD or CD actually loaded in the player must be made.

However, since DVDs and CDs are the same in contour and size, a user of the disc player cannot discriminate between a DVD and a CD from the external appearance of the disc, and may fail to indicate to the disc player the type of disc being played.

SUMMARY

In view of the above-described problem, the present invention is directed to an optical recording medium playback apparatus capable of quickly and automatically identifying the kind of a disc loaded into the apparatus.

To achieve this, according to one aspect of the present invention, there is provided an optical recording medium playback apparatus (player) wherein, after a disc to be checked has been loaded into the apparatus, the disc is first driven in a DVD servo mode and is recognized as a DVD if a peak value of a focus error signal detected in this mode is larger than a threshold value, and wherein, if the detected peak value of the focus error signal is smaller than the threshold value, the checked disc is thereafter driven in a CD servo mode and is recognized as a CD if a peak value of a focus error signal detected in this mode is larger than another threshold value.

According to another aspect of the present invention, there is provided an optical recording medium playback apparatus wherein a disc loaded in the apparatus to be checked is identified as a DVD or a CD according to the ratio of (a) a peak value of a focus error signal detected when the disc is driven in a DVD servo mode and (b) a peak value of a focus error signal detected when the disc is driven in CD servo mode.

DETAILED DESCRIPTION

Figure 1:
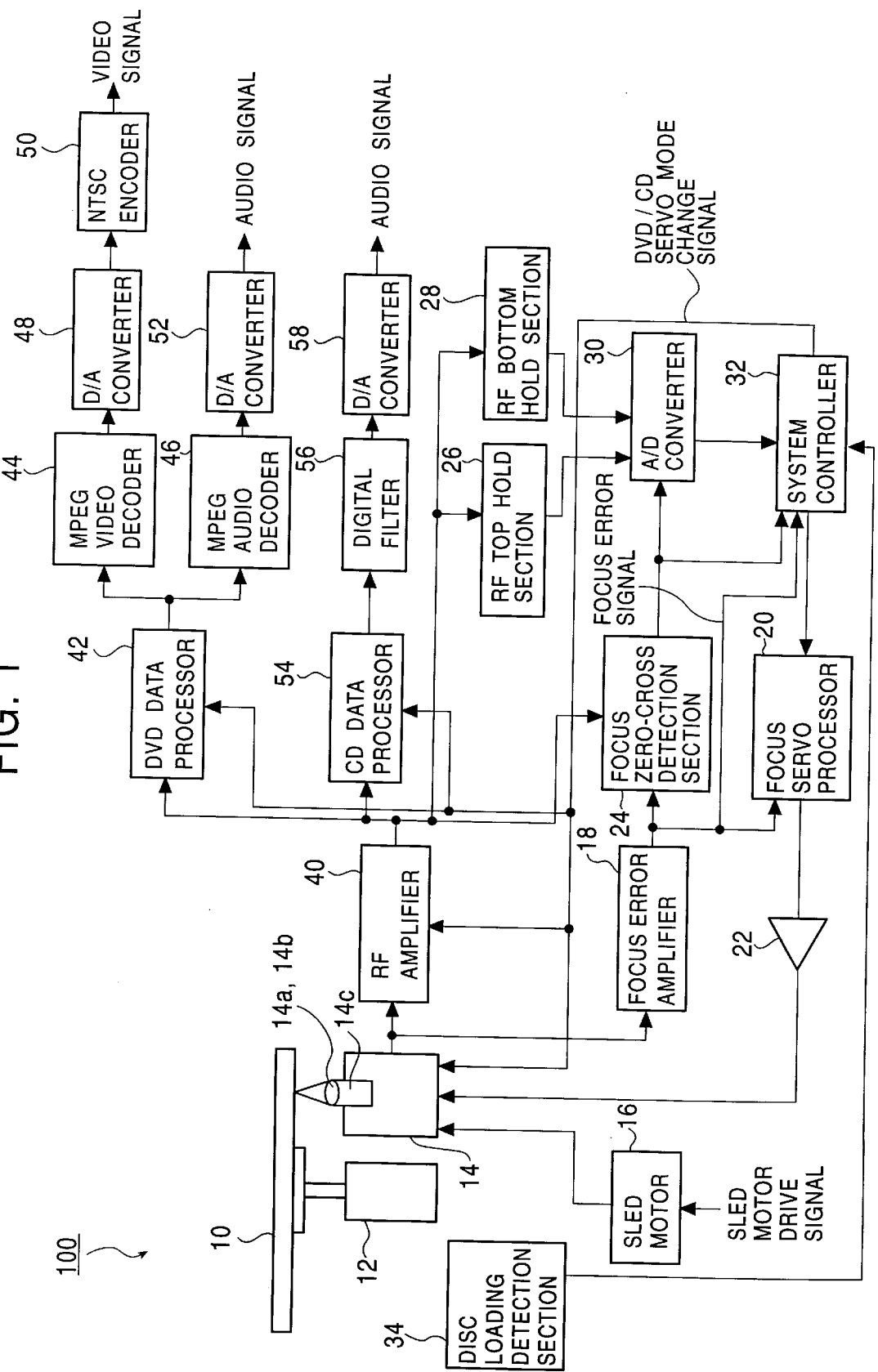
FIG. 1 is a block diagram showing a digital disc player 100 which is an embodiment of the present invention.

FIG. 1 is a block diagram of a digital disc player 100 which is an embodiment of the present invention.

The digital disc player 100 identifies, as a DVD or CD, a loaded disc 10 to be checked, determines a DVD mode or a CD mode on the basis of the identification, reads a signal recorded on the checked disc 10, and performs subsequent processing to play back images and sounds from the disc 10.

The digital disc player 100 has a spindle motor 12, an optical pickup 14, a sled motor 16, a focus error amplifier 18, a focus servo processor 20, a focus actuator driver 22, a focus zero-cross detection section 24, an RF top hold section 26, an RF bottom hold section 28, an analog-to-digital converter (A/D converter) 30, a system controller 32, and a disc loading detection section 34, each of these elements is itself conventional.

The spindle motor 12 rotates the checked disc 10 at a constant linear velocity. The optical pickup 14 reads the recording signal from the checked disc 10. The optical pickup 14 includes a DVD objective lens 14a and a CD objective lens 14b for condensing illumination light from a semiconductor laser device (not shown) and conducting light reflected from a signal recording surface of the checked disc 10 to a photodiode (not shown), and a focus actuator 14c for adjusting the focus position by moving the objective lens 14a or 14b in a direction perpendicular to the recording surface of the checked disc 10.

The focus error amplifier 18 forms a focus error signal from a signal output from the optical pickup 14 and amplifies the focus error signal. An output signal from the focus error amplifier 18 is input to the focus servo processor 20 and to the focus zero-cross detection section 24. The focus error signal exhibits a voltage value according to the distance between the objective lens 14a or 14b in the optical pickup 14 and the in-focus position (the distance between the focal point of the objective lens and the position of the objective lens when the focal point coincides with the signal recording surface of the checked disc 10).

The focus servo processor 20 forms a signal necessary for the focus servo by performing phase compensation of a high-frequency component and amplification of a low-frequency component of the input focus error signal, and amplifies this signal to generate a voltage necessary for driving the focus actuator driver 22. The focus actuator driver 22 energizes the focusing coil of the focus actuator 14c in the optical pickup 14 according to the drive voltage applied from the focus servo processor 20. By this energization, the position of the objective lens 14a or 14b is moved in a direction perpendicular to the signal recording surface of the checked disc 10.

The system controller 32 performs overall control of the entire digital disc player 100 to play back images and sounds recorded on the checked disc 10, and outputs a signal for changeover between the DVD servo mode and the CD servo mode. The system controller 32 includes a threshold generator for generating a predetermined threshold value, and a comparator for comparing a peak value of the focus error signal with the threshold value, and a disc discriminator element.

The disc discrimination element first drives the checked disc 10 in the DVD mode after the checked disc 10 has been loaded in the disc player 100. If the detected peak value of the focus error signal is larger than the first threshold value, the disc discrimination element determines that the checked disc 10 is a DVD. If the detected peak value of the focus error signal is smaller than the first threshold value, the disc discrimination element drives the checked disc 10 in the CD servo mode after the drive in the DVD mode. If the detected peak value of the focus error signal is larger than a second threshold value different from the first threshold value, the disc discrimination element determines that the checked disc 10 is a CD.

The digital disc player 100 also includes an RF amplifier 40, a DVD data processor 42, an MPEG video decoder 44, an MPEG audio decoder 46, a digital-to-analog converters (D/A converters) 48, 52, and 58, an NTSC encoder 50, a CD data processor 54, and a digital filter 56; all are conventional.

The RF amplifier 40 amplifies the signal output from the optical pickup 14. The amplification factor of the RF amplifier 40 is changeable according to whether the checked disc 10 is a DVD or CD. If the checked disc 10 is a DVD, the size of the pits formed in the signal recording surface is smaller and the difference between the intensities of reflected light corresponding to the existence/nonexistence of pits is smaller than for a CD. In this case, therefore, the amplification factor is set to a larger value. If the checked disc 10 is a CD, the size of pits formed in the signal recording surface is larger and the difference between the intensities of reflected light corresponding to the existence/nonexistence of pits is larger than for a DVD. In this case, therefore, the amplification factor is set to a smaller value.

The focus zero-cross detection section 24 detects a zero-cross of the focus error signal output from the focus error amplifier 18 when the amplitude of the output of the RF amplifier 40 is equal to or larger than a predetermined value. The RF top hold section 26 holds the upper level of the envelop of the signal amplitude (RF signal) output from the RF amplifier 40 while the RF bottom hold section 28 holds the lower level of the envelop of the RF signal amplitude. These levels can be obtained by envelop detection of the RF signal. The difference between these levels represents the total amplitude of the RF signal.

The A/D converter 30 receives the upper and lower levels of the envelop of the RF signal respectively held by the RF top hold section 26 and the RF bottom hold section 28 when a focus zero-cross signal is output from the focus zero-cross detection section 24. The A/D converter 30 converts the voltage level (analog signal) of each of the upper and lower envelop levels into digital data. The digital data corresponding to the upper level and the digital data corresponding to the lower level are input to the system controller 32.

The DVD processor 42 demodulates the signal output from the RF amplifier 40 to recover MPEG data and also performs various digital signal processing functions, such as error correction processing, MPEG video and audio data separation processing and address information extraction processing. The MPEG video decoder 44 decodes the MPEG video data separated by the DVD data processor 42 into MPEG2 video data. The decoded video data is input to the digital-to-analog converter 48 to form a brightness signal Y and color difference signals Cb and Cr. Further, the NTSC encoder 50 constructs an NTSC signal (video signal) from these brightness and color difference signals. The MPEG audio decoder 46 decodes the MPEG audio data separated by the DVD processor 42 into MPEG2 audio data. The decoded audio data is converted into an analog audio signal by being passed through the D/A converter 52.

The CD data processor 54 demodulates the signal output from the RF amplifier 40 by demodulation corresponding to eight to fourteen modulation (EFM) and decodes the demodulation result by cross interleaved Reed Solomon code (CIRC) decoding, thereby outputting audio data. This audio data is over-sampled with the digital filter 56, and the over-sampling result is passed through the D/A converter 58 to obtain an analog audio signal.

Figure 2:
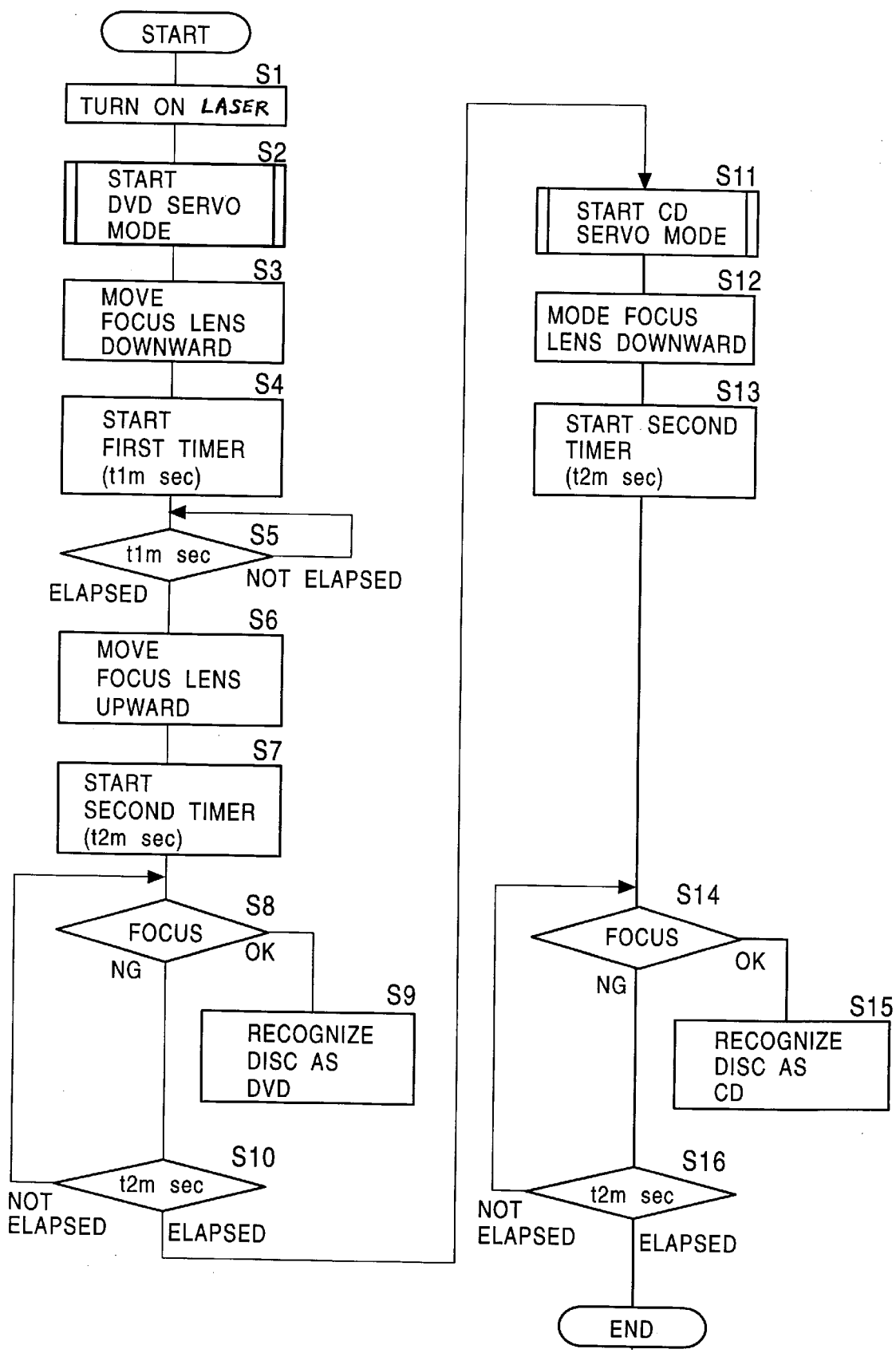
FIG. 2 is a flowchart showing the operation of the embodiment shown in FIG. 1.

Operation of this embodiment is described with reference to the flowchart of FIG. 2.

First, a disc 10 to be checked is loaded in the disc player 100 and is rotated and the laser system is turned on (S1). The system controller 32 (e.g. a micro-controller or microprocessor) first starts the DVD servo mode (S2), moves the focusing lens downward by operating the optical pickup 14 (S3), and starts (S4) a first timer which measures a time t1 msec (this first timer incorporated in the system controller 32). Time t1 msec after the start of the timer (S5), the focusing lens reaches its lowest point.

The system controller 32 then moves the focusing lens upward (S6) and starts (S7) a second timer which measures a time t2 msec (this second timer is also incorporated in the system controller 32). If, before elapse of the second timer time t2 msec, a peak value of the focus error signal is larger than the first threshold value, that is, the focusing lens is just focused (S8, S10), the system controller 32 then determines that the checked disc 10 is a DVD (S9).

On the other hand, if the lens is unfocused (NG) at elapse of the second timer time t2 msec, that is, the peak value of the focus error signal is smaller than the first threshold value (S8, S10), the system controller 32 changes the servo mode to the CD servo mode (S11), again moves the focusing lens downward by operating the optical pickup 14 (S12), and again starts the second timer (S13). If, before elapse of the second timer time t2 msec, a peak value of the focus error signal is larger than the second threshold value, that is, the focusing lens is just focused (S14, S16), the system controller 32 determines that the checked disc 10 is a CD (S15).

Figure 3:
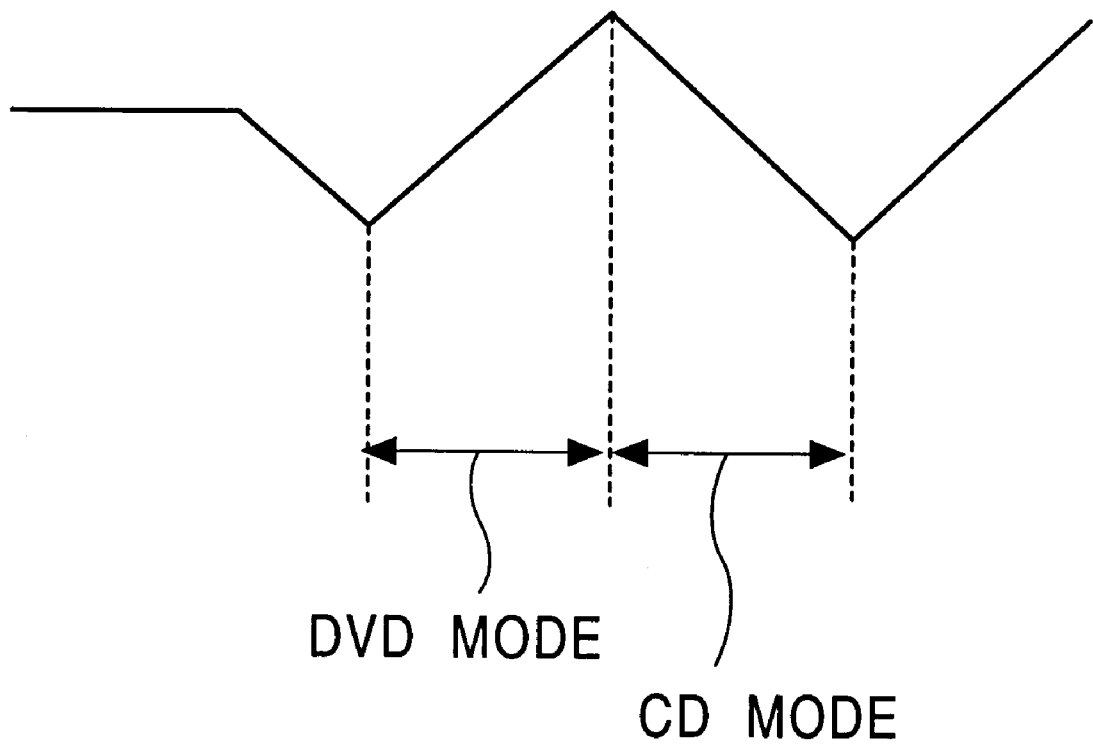
FIG. 3 is a diagram showing the relationship between the upward and downward movements of the focusing lens and DVD and CD modes in the embodiment shown in FIGS. 1 and 2.

FIG. 3 illustrates graphically (horizontal axis is time, vertical axis is focusing lens height) the process in which the focusing lens is moved downward when the operation of driving the disc player 100 is started; the DVD mode is thereafter first executed by moving the focusing lens upward, and the CD mode is next executed by moving the focusing lens downward. It is to be understood the present apparatus and method are carried out under control of software (code) stored in a memory associated with system controller 32 and executed by system controller 32; while this code is not shown here, it is readily written by one of ordinary skill in the art in light of this disclosure.

In the above-described embodiment, the kind of disc loaded in the disc player 100 is automatically and quickly recognized.

The system controller 32 also may function as a second type of disc discrimination element. The second type of disc discrimination element recognizes a checked disc 10 as a DVD or CD according to the ratio of a peak value of the focus error signal detected when the checked disc 10 loaded in the disc player 100 is driven in the DVD servo mode and a peak value of the focus error signal when the checked disc 10 is driven in the CD servo mode.

The operation where the system controller 32 function as the second type of disc discrimination element is next described.

Figure 4:
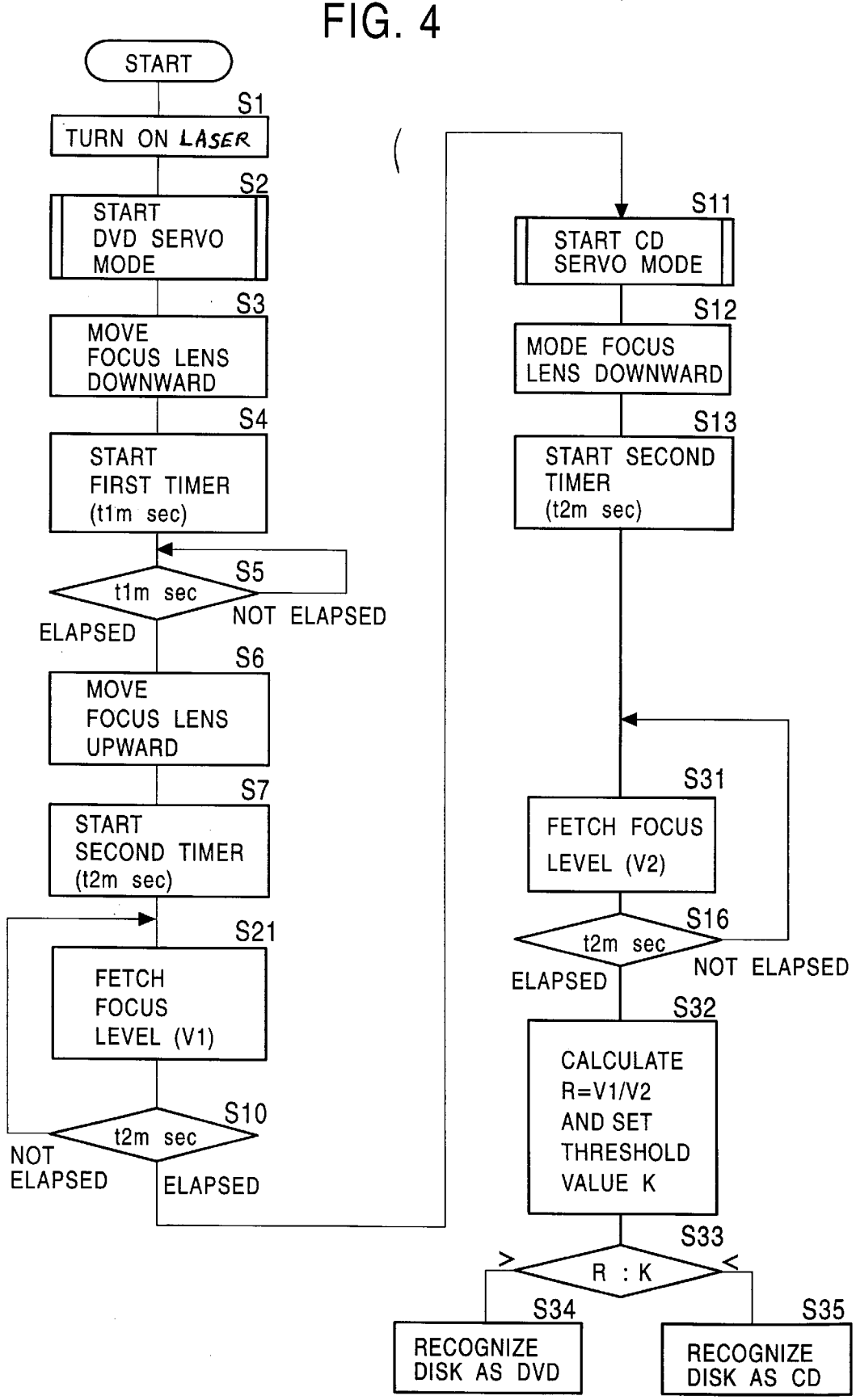
FIG. 4 is a flowchart showing the operation of the disc player 100 in the case where the system controller 32 has a second disc discrimination function.

FIG. 4 is a flowchart showing the operation of the disc player 100 in the case where the system controller 32 function as the second type of disc discrimination element.

First, a disc 10 to be checked is loaded in the disc player 100 and is rotated and the laser system is turned on (S1). The system controller 32 first starts the DVD servo mode (S2), moves the focusing lens downward by operating the optical pickup 14 (S3), and starts a first timer (the first timer is incorporated in the system controller 32) which measures a time t1 msec (S4). Time t1 msec after the start of the timer (S5), the focusing lens reaches its lowest point. The system controller 32 then moves the focusing lens upward (S6), starts a second timer (incorporated in the system controller 32) which measures a time t2 msec (S7), and fetches a peak value V1 of the focus level prior to elapse of the second timer time t2 msec (S21).

After elapse of the second timer time t2 msec (S10), the system controller 32 changes the servo mode to the CD servo mode (S11), again moves the focusing lens downward by operating the optical pickup 14 (S12), again starts the second timer (S13), and fetches a peak value V2 of the focus level prior to elapse of the second timer time t2 msec (S31).

After elapse of the second timer time t2 msec (S16), the system controller 32 calculates the ratio R of the focus level V1 and the focus level V2 (S32). If this ratio R is larger than a predetermined threshold value K (S33), the system controller 32 determines that the checked disc 10 is a DVD (S34). If the ratio R is smaller than the predetermined threshold value K (S33), the system controller 32 determines that the checked disc 10 is a CD (S35).

Figure 5A:
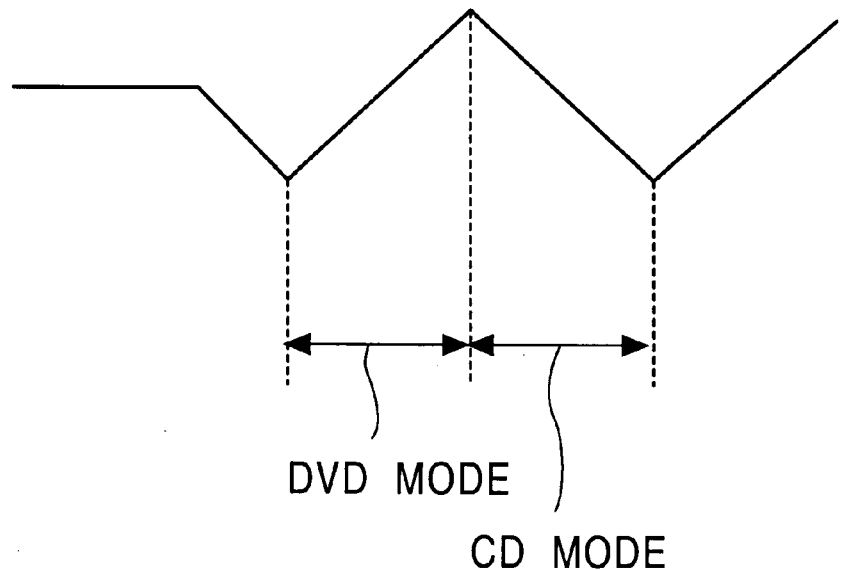
FIGS. 5A and 5B are diagrams showing the relationship between the upward and downward movements of the focusing lens and DVD and CD modes in the embodiment shown in FIG. 4.

FIG. 5A (similar to FIG. 3) illustrates graphically the process in which, for the FIG. 4 embodiment, the focusing lens is moved downward when the operation of driving the disc player 100 is started, the DVD mode is thereafter first executed by moving the focusing lens upward, and the CD mode is next executed by moving the focusing lens downward.

In the embodiment shown in FIG. 4, the kind of a disc loaded in the disc player 100 is automatically recognized in a short time.

Figure 5B:
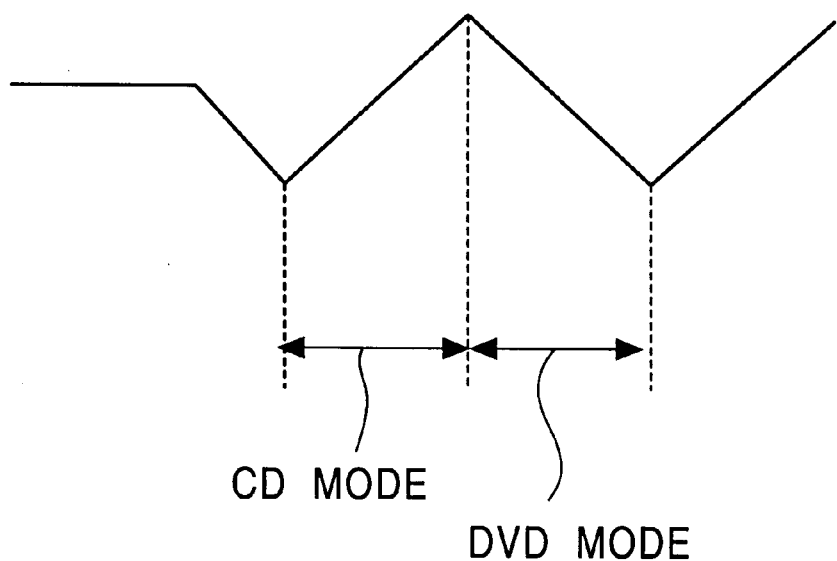

An operation reverse to that shown in FIG. 5A may be performed. That is, as shown in FIG. 5B, in the embodiment shown in FIG. 4, the focusing lens is moved downward when the operation of driving the disc player 100 is started, the CD mode is thereafter first executed by moving the focusing lens upward, and the DVD mode is next executed by moving the focusing lens downward. This process also enables the kind of a disc loaded in the disc player 100 to be automatically and quickly recognized.

As described above, the present invention ensures that the kind of a disc loaded in the disc player 100 is automatically and quickly recognized.

This description is illustrative and not limiting; further modifications will be apparent to one skilled in the art and are intended to fall within the scope of the appended claims.

What is claimed is:

1. An apparatus for playing back an optical recording medium by reading information recorded on the optical recording medium, said apparatus comprising:

a focus error signal element which provides a focus error signal from information read from the optical recording medium; and a system controller coupled to the focus error signal element and which identifies the optical recording medium, said system controller driving the optical recording medium in a first servo mode and recognizing the optical recording medium as a first kind of optical recording medium if a peak value of a focus error signal provided in the first servo mode by said focus error signal element is larger than a first threshold value, said system controller driving the optical recording medium by changing the servo mode from the first servo mode to a second servo mode if the peak value of the focus error signal is smaller than the first threshold value, said system controller recognizing the optical recording medium as a second kind of optical recording medium if a peak value of a focus error signal provided in the second servo mode by said focus error signal element is larger than a second threshold value.

2. An apparatus according to claim 1, wherein the first servo mode is a DVD servo mode; the second servo mode is a CD servo mode; the first kind of optical recording medium is a DVD; and the second kind of optical recording medium is a compact disc.

3. An apparatus according to claim 1, further comprising an optical pickup located to read information from the optical recording medium, and an amplifier coupled to said pickup and which amplifies a signal output from said optical pickup, said amplifier setting a factor for amplification of the output signal according to a size of the pits in the optical recording medium.

4. An apparatus according to claim 1, further comprising a digital versatile disc data processor and a compact disc data processor, said digital versatile disc data processor demodulating data from a digital versatile disc to recover MPEG data, separating MPEG video data and MPEG audio data from the MPEG data and outputting the MPEG video and audio data, said compact disc data processor demodulating data from a compact disc by demodulation corresponding to eight to fourteen modulation to output predetermined audio data.

5. A method of identifying an optical recording medium in an apparatus for playing back the optical recording medium by reading information recorded on the optical recording medium, said method comprising the steps of:

(a) moving an optical pickup downward and then upward in a first servo mode and recognizing the optical recording medium as a first kind of optical recording medium if a peak value of a focus error signal during the upward movement of the optical pickup is larger than a first threshold value;

(b) changing the servo mode from the first servo mode to a second servo mode if the peak value of the focus error signal is smaller than the first threshold value; and (c) moving the optical pickup downward and then upward in the second servo mode and recognizing the optical recording medium as a second kind of optical recording medium if a peak value of a focus error signal during the upward movement of the optical pickup is larger than a second threshold value.

6. A method according to claim 5, wherein said step (a) is such that, in the first servo mode, the optical pickup is moved downward during a first period and is moved upward during a second period following the first period, and the optical recording medium is recognized as the first kind of optical recording medium if the peak value of the focus error signal before the end of the second period is larger than the first threshold value;

said step (b) is such that the servo mode is changed from the first servo mode to the second servo mode if the peak value is smaller than the first threshold value even at the end of the second period; and said step (c) is such that the optical pickup is again moved downward in the second servo mode during the first period and is then moved upward during the second period following the first period, and the optical recording medium is recognized as the second kind of optical recording medium if the peak value of the focus error signal before the end of the second period is larger than the second threshold value.

7. A method according to claim 6, wherein the first servo mode is a digital versatile disc servo mode; the second servo mode is a compact disc servo mode; the first kind of optical recording medium is a digital versatile disc; and the second kind of optical recording medium is a compact disc.

* * * * *